2,884,457

SEPARATION OF ISOMERIC XYLYLENE DIAMINES

Louis L. Ferstandig, El Cerrito, Calif., assignor to California Research Corporation, San Francisco, Calif., a corporation of Delaware No Drawing. Application March 15, 1955
Serial No. 494,570

5 Claims. (Cl. 260—570.9)

This invention relates to a process for separating mixtures of meta-xylylenediamine and para-xylylenediamine to obtain either or both of the isomers, or the corresponding dihydrochlorides, in substantially pure form.

The oxidation of mixed xylenes, especially mixtures of meta-xylene and para-xylene, yields mixtures of phthalic acids which can be passed over a dehydration catalyst with ammonia to produce phthalonitriles, which, in turn, are reduced to xylylenediamines. The xylylenediamines are useful in the production of higher molecular weight polyamides which are processed to yield synthetic fibers, or films. For example, the xylylenediamines can be condensed with adipic acid to form valuable polyamides. The properties of the polyamides produced from meta-xylylenediamine and para-xylylenediamine by condensation with a given dicarboxylic acid differ quite markedly in properties, and it is desirable to separate the isomeric diamines to permit production of polyamides of desired properties. The xylylenediamines are also useful as intermediates in the production of diisocyanates which are employed in the production of Vulcollan-type rubbers. The isomeric diisocyanates differ in properties and it is desirable to have single isomers rather than mixtures of isomers in order to control final product quality.

It is the object of this invention to provide a method for separating mixtures of meta-xylylenediamine and para-xylylenediamine to obtain the individual diamine isomers in substantially pure form.

Pursuant to the invention, mixtures of meta-xylylenediamine and para-xylylenediamine are converted to the corresponding dihydrochlorides. A slurry of the dihydrochlorides in water is formed and the slurry is separated into a solid phase and a liquid phase. Both phases will differ from the original diamine mixture in respect to isomer distribution, provided that the original mixture contains above about 3% of the para-isomer. The liquid phase will be richer in the meta-isomer than the original mixture, while the solid phase will be richer in the para-isomer than the original mixture.

Separation of xylylenediamine mixtures pursuant to the invention is unexpectedly effective and efficient. A study of the properties of the xylylenediamine dihydrochlorides indicated that the solubility of meta-xylylenediamine dihydrochloride in water at 25° C. is about 54% by weight, and that the solubility of para-xylylenediamine dihydrochloride in water at 25° C. is about 13% by weight. On the basis of these observations, it would be expected that when a mixture of the two dihydrochlorides was brought to equilibrium with water so as to leave a solid dihydrochloride phase containing a quantity of each of the two isomers, the saturated solution in equilibrium with the solid would contain meta-xylylenediamine dihydrochloride and para-xylylenediamine dihydrochloride in solution in proportions of approximately 4 to 1. It would not be expected on the basis of the solubility observations that any effective separation of the isomers could be made based on the differential solubility in water. It was found, however, that when water was added to a mixture of the solid dihydrochlorides, and the mixture brought to equilibrium producing a saturated solution of dihydrochlorides in contact with a solid phase containing both dihydrochloride isomers, that the actual ratio of meta-xylylenediamine dihydrochloride to para-xylylenediamine dihydrochloride was not in the expected 4:1 ratio, but was 32:1. Thus, the proportion of para-xylylenediamine dihydrochloride contained in such a solution, instead of amounting to 20% as expected, amounted to about 3%. With this very favorable distribution of the two isomeric dihydrochlorides in the saturated water phase, efficient separation of the two isomers is made possible.

The process of the invention is illustrated by the following example.

136 g. (1 mol) of a mixture of meta-xylylenediamine and para-xylylenediamine containing 85% of the meta-xylylenediamine is mixed with 20 ml. of water and cooled in ice. 164 ml. of 37% hydrochloric acid (195 g., 2 mols) is added slowly. A total of 209 g. of dihydrochlorides in 142 g. of water is obtained. The mixture is filtered, yielding about 35 g. of solid and about 315 g. of solution. The solid is washed with about 200 ml. of a mixture of isopropanol and water (80% isopropanol–20% water by volume). The washings and the filtrate are combined and evaporated to dryness, yielding 176 g. of meta-xylylenediamine dihydrochloride, which is 97% pure. The solid filter cake is equilibrated at 25° C. with two 100 ml. portions of the above-described isopropanol-water mixture and filtered to remove traces of the meta-xylylenediamine dihydrochloride. 26 g. of pure para-xylylenediamine dihydrochloride are obtained.

The xylylenediamine mixtures separated pursuant to the invention must contain above 3% of para-xylyenediamine in order for the present process to be operable. Usually, the diamine mixtures treated pursuant to the invention contain from 5 to 30%, or more, of para-xylylenediamine. The quantity of water used in forming the slurry of xylylenediamine dihydrochlorides can be varied over a considerable range. In order to produce any useful result, the quantity of water employed must be at least sufficient to form a distinct aqueous phase and insufficient to take all of the xylylenediamine dihydrochlorides into solution. The degree of separation accomplished pursuant to the invention depends upon the amount of water employed in forming the slurry. If the quantity of water employed is so small that a substantial proportion of the meta-xylylenediamine dihydrochloride remains undissolved, then only the liquid phase contains one isomer at high purity, i.e., the meta-isomer at about 97% purity. If the quantity of water employed in forming the slurry is sufficient to dissolve all or very nearly all of the meta-xylylenediamine dihydrochloride contained in the mixture, then the filtrate from the slurry will contain the meta-isomer at 97% purity, while the filter cake will be substantially pure para-xylylenediamine dihydrochloride.

The process of the invention is ordinarily conducted at atmospheric temperature, but may be operated at higher temperatures below the boiling point of water, if desired. Ordinarily, temperatures ranging from 10 to 60° C. will be employed.

The filter cake which in the preferred method of operating will consist almost entirely of para-xylylenediamine dihydrochloride can be purified by washing with mixtures of water and low molecular weight alcohols. Mixtures of isopropyl alcohol and water containing 10 to 30% of water are especially useful.

The para-xylylenediamine dihydrochloride filter cake or meta-xylylenediamine dihydrochloride recovered from the filtrate may be used as such in the production of diisocyanates by suspending the individual xylylenediamine dihydrochlorides in an inert high boiling solvent and passing phosgene through the mixture at high temperature.

If it is not desired to use the dihydrochloride products as such, they may be reconverted to the diamines in conventional manner. For example, 2 mols of sodium hydroxide can be added to each mol of the dihydrochloride to produce 2 mols of sodium chloride and one mol of diamine which can be distilled from the reaction product.

I claim:

1. A process for the separation of a xylylenediamine dihydrochloride mixture of meta-xylylenediamine dihydrochloride and para-xylylenediamine dihydrochloride containing from about 5 to 30% of the latter dihydrochloride, which comprises adding to said mixture an amount of water sufficient to form an aqueous phase but insufficient to dissolve all of the xylylenediamine dihydrochlorides, thereby forming an aqueous phase and a solid phase, and separating the phases.

2. Process according to claim 1 wherein the amount of water is added in an amount just sufficient to dissolve substantially all of the meta-xylylenediamine dihydrochloride.

3. Process according to claim 1, wherein the water is added at a temperature in about the range of 10° C. to 60° C.

4. Process according ot claim 3, wherein the amount of water is added in an amount just sufficient to dissolve substantially all of the meta-xylylenediamine dihydrochloride.

5. A process for separating a xylylenediamine mixture of meta-xylylenediamine and para-xylylenediamine containing about 5 to 30% of the latter diamine, which comprises adding ot said mixture an amount of hydrochloric acid sufficient to convert both isomers of said xylylenediamine to their hydrochloric acid salts and an amount of water sufficient to form an aqueous phase but insufficient to dissolve all of the xylylenediamine dihydrochlorides, thereby forming an aqueous phase and a solid phase, and separating the phases.

References Cited in the file of this patent

UNITED STATES PATENTS

| | | |
|---|---|---|
| 1,722,026 | Weiland et al. | June 28, 1929 |
| 1,794,097 | Weiland et al. | Feb. 24, 1931 |
| 1,861,890 | Tschunkur et al. | June 7, 1932 |
| 1,878,970 | Mills | Sept. 20, 1932 |

OTHER REFERENCES

Experimental Organic Chemistry, Nollis, McGraw-Hill Co., pp. 3–5.